United States Patent [19]

Brumby

[11] Patent Number: 5,064,160
[45] Date of Patent: Nov. 12, 1991

[54] CLAMPING DEVICE

[75] Inventor: John A. Brumby, St. Austell, England

[73] Assignee: Ace Conveyor Equipment Limited, Doncaster, England

[21] Appl. No.: 510,878

[22] Filed: Apr. 18, 1990

[30] Foreign Application Priority Data

Apr. 28, 1989 [GB] United Kingdom ............... 8909841
Nov. 14, 1989 [GB] United Kingdom ............... 8925668

[51] Int. Cl.$^5$ ............................................. A47F 5/00
[52] U.S. Cl. ................................. 248/316.5; 24/502; 24/510; 24/569; 267/169; 269/254 R
[58] Field of Search ............... 248/316.5, 231.5, 228, 248/621, 609; 269/254; 267/169; 24/510, 502, 569

[56] References Cited

U.S. PATENT DOCUMENTS

| | | |
|---|---|---|
| 2,082,499 | 6/1937 | Keyworth ................ 248/621 X |
| 2,174,789 | 10/1939 | Kennedy ................ 24/510 X |
| 2,767,893 | 10/1956 | Latson ................ 269/254 R X |
| 3,452,976 | 7/1969 | Ross ................ 269/254 R |
| 3,504,881 | 4/1970 | Pillons et al. ................ 248/609 X |
| 3,606,228 | 9/1971 | Lasko ................ 248/316.5 |
| 3,812,571 | 5/1974 | Dori ................ 269/254 R |

Primary Examiner—David L. Talbott
Attorney, Agent, or Firm—Banner, Birch, McKie & Beckett

[57] ABSTRACT

A device for clamping a panel such as a conveyor belt skirt rubber in position, comprising a support body attachable to a fixed support such as a conveyor feed boot or skirt board, a clamp arm pivotally mounted to the support body, and resilient biasing means for urging the clamp arm to turn about the pivotal connection to the support body, in which the resilient biasing means comprises a helical coil stressed in torsion to apply the required resilient biasing to hold the clamp arm in a required position.

12 Claims, 3 Drawing Sheets

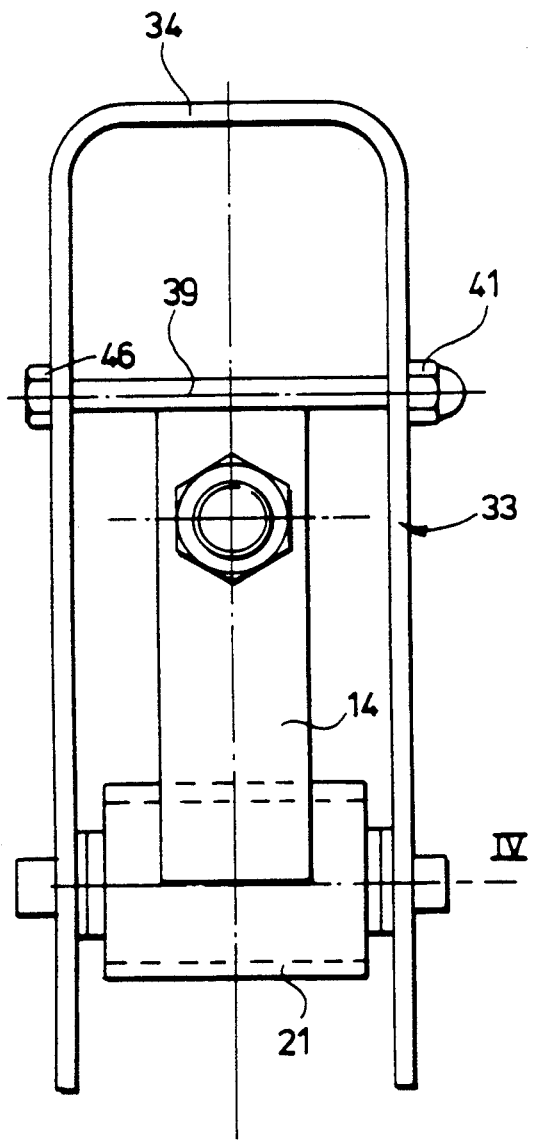
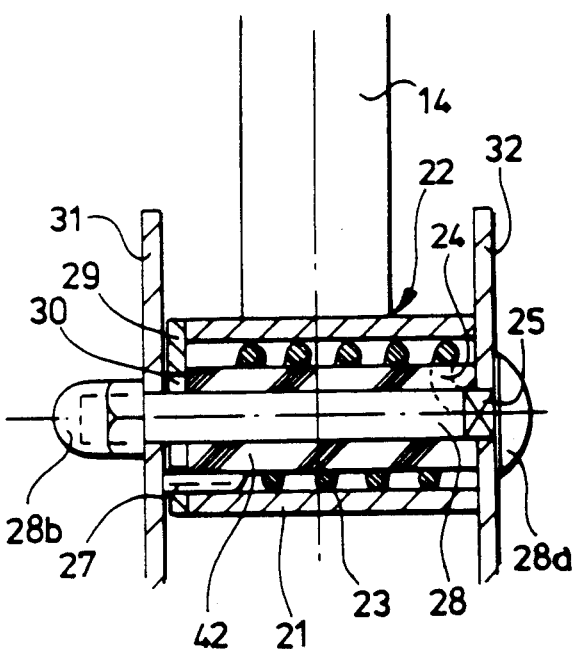
FIG 3
FIG 4

CLAMPING DEVICE

BACKGROUND OF THE INVENTION

Resiliently urged clamps are convenient for a number of purposes where a member has to be retained in position temporarily, or even over an extended period of time if periodic adjustment of the position is required. One typical such application is that referred to above, namely that of retaining a skirt rubber for a conveyor belt. Skirt rubbers are laminar elements which define a volume about a moving conveyor belt to retain bulk materials being conveyed thereon, and therefore have one edge in contact with the moving belt which gradually wears in use. For this reason it is necessary to be able to adjust the position of the skirt rubber to take up the wear after a period of service. Conveyor belts for bulk material are typically used in the mining or minerals processing industries, and the environment of the conveyor is frequently contaminated with aggressive chemicals so that any clamp utilising accurately formed components having a high tolerance or close moving parts is liable to failure due to corrosion. One known skirt rubber clamping device involves the use of a resilient rubber bush which can be stressed in torsion to apply the required turning moment about a clamping lever arm. One disadvantage experienced with such bushes, however, is a fact that, because they are static but under load throughout their working life the resilient material can acquire a "set" gradually losing the torsional biasing force until the skirt rubber previously held in place can slip. Devices incorporating rubber bushes are relatively expensive to manufacture partly because of the cost of the materials themselves, and partly because of the specialist equipment required to press the bushes into position and form a vulcanised bond between the resilient material (usually rubber) and the metal inner and outer sleeves of the bush. Failure of the vulcanised bond between the rubber bush and one or other of the metal sleeves can also lead to total failure of the clamp since, without the bond, no resilient force can be applied.

OBJECTS OF THE INVENTION

A primary object of the present invention is to provide a clamping device which does not have such requirements, but which nevertheless is capable of exerting a clamping force over an extended period of time without failure.

Another object of the present invention is to provide resilient clamping devices for such purposes that require no holes in the skirt rubbers or other members being retained in position, nor any clamping straps.

SUMMARY OF THE INVENTION

According to the present invention, therefore, a device for clamping a panel such as a conveyor belt skirt rubber in position comprises a support body attachable to a fixed support such as a conveyor feed boot or skirt board, a clamp arm pivotally mounted to the support body, and resilient biasing means for urging the clamp arm to turn about the pivotal connection to the support body, in which the resilient biasing means comprises a helical coil stressed in torsion to apply the required resilient biasing to hold the clamp arm in a required position, and a body of resilient material having a substantially cylindrical surface against which the turns of the helical coil engage when they change diameter as torsional forces are exerted thereon.

Unlike systems in which the skirt rubbers are held in place by bolts, the clamping devices of the present invention have no bolts which require releasing when adjustment or replacement of a skirt rubber is required. Likewise, there are no metal-to-metal components in relative motion which may be liable to jamming by corrosion. The clamping device of the present invention is also capable of accommodating members of different thicknesses over a considerable range, typically between 8 mm and 20 mm.

Preferably the said body of resilient material is generally tubular and located radially inside the turns of the helical coil. Likewise it is preferred that the said body of resilient material is located in position by a central shaft or stem passing therethrough.

In a preferred embodiment of the invention the clamp arm is pivoted at a point intermediate its length and at the end remote from the clamping end is formed as a handle which can be gripped by an operator or an operating tool.

Preferably the operating end of the clamp arm is provided with an appropriate clamp member shaped to spread the load of the clamping force over a wider area of the item being clamped than the end of the clamp arm.

The clamp arm may further be provided with means for releasing the clamping force by movement against the resilient bias of the helical coil. The clamp arm release means may include a latching pin or other voluntarily engageable or disengageable retaining member.

In a preferred embodiment of the invention the support body on which the clamp arm is pivotally mounted is secured by a transverse bolt or pin at an upper end thereof with an orthogonal pivot (orthogonal, that is, to the said transverse bolt or pin) at a lower end thereof carrying the clamp arm.

The support body in the preferred embodiment carries a tubular transverse spring housing having a slot receiving a radially outwardly bent end of the helical coil by which the torsional force is transmitted thereto.

The clamp arm is preferably provided with a prismatic hole or holes receiving a correspondingly prismatic pin having a radial hole receiving a radially inwardly projecting end of the helical coil by which torsion is transmitted thereto, and thereby to the clamp arm via the form interconnection of the prismatic hole or holes and the prismatic pin.

The helical coil may be made of any suitable material although in view of the long periods of static load it is preferred that a metal coil spring be used since these are capable of retaining their spring force under stress without fatigue when in a static situation. Other torsion springs may alternatively be used, the essential guiding principle being that the torsion is applied between one end of the spring and the other rather than between radially inner and outer positions as in the previously known resilient bush clamps.

The clamp arm is preferably of inverted U-shape with the bight of the U being located at the end remote from the said operating end and in such an embodiment it is preferred that the lateral limbs of the clamp arm are provided with slots housing a latching pin engageable into a notch in the said support body whereby to hold the clamp arm in a release position.

Other features and advantages of the present invention will become apparent from a study of the following detailed description in which reference is made to the accompanying drawings provided purely by way of non-limitative example only.

BRIEF DESCRIPTION OF THE DRAWINGS

FIG. 3 is a view in the direction of arrow A of FIG. 2 of the clamping, device of the present invention; and FIG. 4 is an axial sectional view taken on the line IV—IV of FIG. 3.

DESCRIPTION OF THE PREFERRED EMBODIMENT

Figure 1:
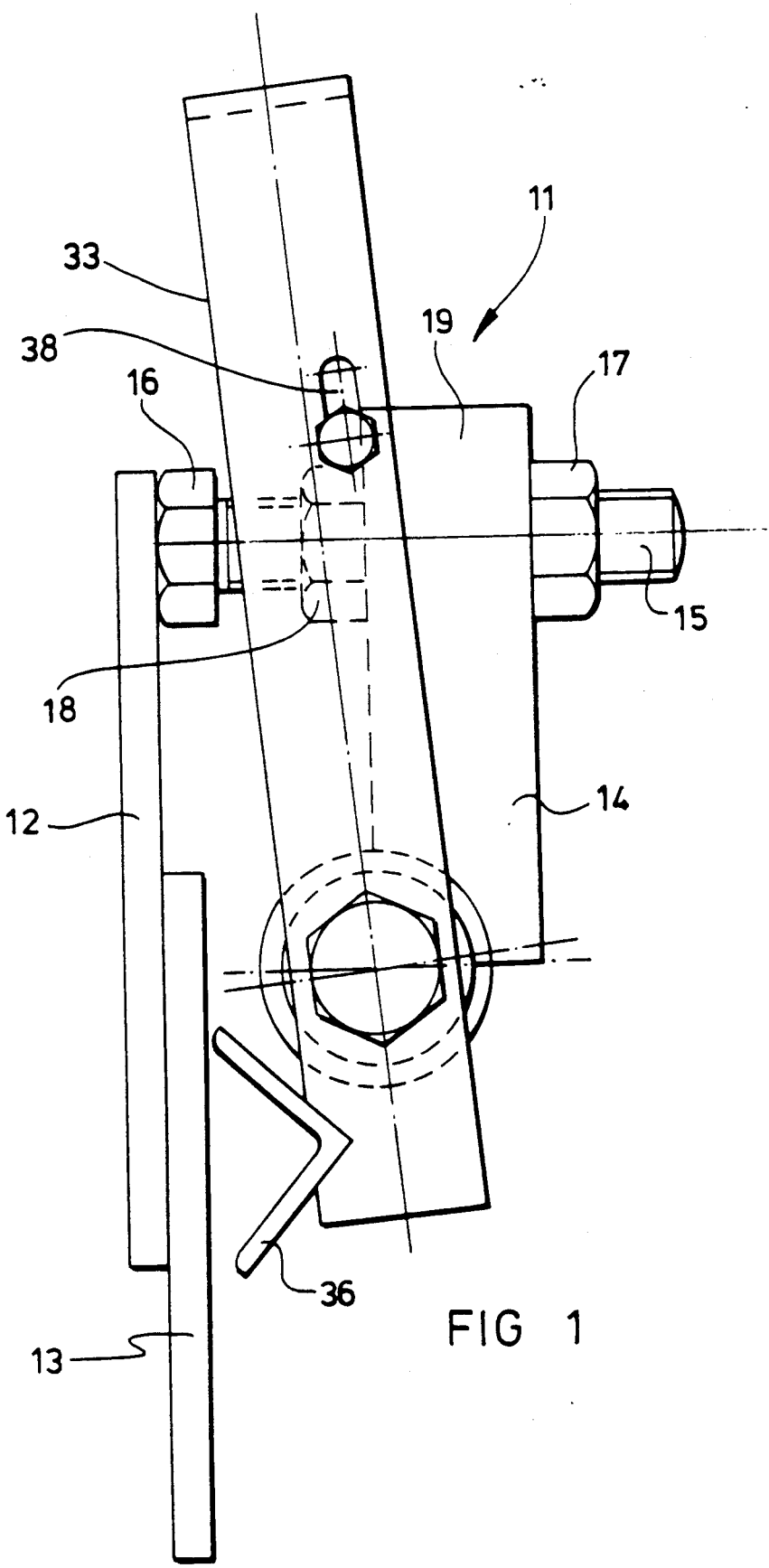
FIG. 1 is a side view of a clamping device formed as an embodiment of the present invention in a release position.

Referring now to the drawings, a clamping device generally indicated with the reference numeral 11 is shown secured to a fixed support 12 which, in this embodiment, is a conveyor belt skirt plate extending parallel to, above and spaced from a conveyor belt (not showing against which a conveyor belt skirt rubber 13 is to be held.

The clamping device 11 comprises a solid body 14 through which passes a clamp bolt 15 the head 16 of which is welded to the conveyor belt skirt plate 12 such that the bolt 15 projects orthogonally with respect thereto. Two locking nuts 17, 18 threadedly engaged on the bolt 15 determine the position of the clamping device body 14 in a direction towards or away from the skirt plate 12 to which the bolt 15 is secured. The bolt 15 is spaced a short distance from the upper face 19 of the body 14 so as to leave a shoulder 20 (FIG. 2) exposed for reasons which will be described in more detail below.

Referring now particularly to FIGS. 3 and 4 the body 14 is secured at its lower end to a circular section tubular transverse sleeve 21 to which it is fixedly welded at 22 (FIG. 4). Within the transverse sleeve 21 is lodged a coil spring 23 one end, 24 of which is bent axially outwardly and lodges in an aperture 25 in one limb 32 of a clamp arm 33. The other end 26 of the spring 23 is bent axially and extends into a correspondingly positioned hole 27 passing transversely through an end plate 29 of the sleeve 21. The end plate 29 has a central hole 30 through which passes a central pin 28, which latter also passes through two aligned holes in the two limbs 31, 32 of the clamp arm 33, which has an overall inverted U-shape comprising the two limbs 31, 32 joined by an upper transverse bight portion 34.

The pin 28 has a domed head 28a and is secured in place by a domed nut 2b. Between this coil spring 23 and the central pin 28 is a tubular elastomeric body 42, which in this embodiment is a sliding fit over the central pin 28. At their lower ends the two limbs 31, 32 are provided with respective aligned notches 35 (FIG. 2) in which a clamp member 36 of L-shape cross-section is received whereby to spread the load of the clamping force applied by the clamping device to the skirt rubber 13.

Finally, the two limbs 31, 32 of the clamp arm 33 are provided with respective aligned slots 38 (only one of which is visible in FIGS. 1 and 2) through which passes latch pin 39 having a head end 40 and a threaded end over which is secured a domed nut 41. The length of the latch pin 39 is such that even when the domed nut 41 is screwed down until the end of the latch pin 3 is engaged tightly against the dome the nut 41 and head 40 are not clamped against the limbs 31, 32 of the clamp arm 33 so that the latch pin 39 is free to move up and down the slots 38.

The slots 38 are positioned such that the latch pin 39 can ride freely on the upper face 19 of the support body 14 until the clamp arm 33 is moved, about the pivotal connection defined by the spring 23 and the square pin 28, and borne by the washers 29, 30.

When the clamp device is fitted to a support such as the skirt plate 12 the head 16 of the bolt 15 is first welded into position land then the support body 14 introduced ove the shaft of the bolt 15 by first screwing on the nut 18, introducing the body 14 and then securing it in position with the nut 17. The nuts 18 and 17 are then screwed along the shaft 15 until the desired clamping force is exerted when the clamp member 36 is fitted into the notches 35 and a skirt rubber 13 is held in position. The spring 23 and elastomeric tubular body 42 are selected and oriented in such a way that, in this position, the clamp arm 33 lies approximately parallel to the support body 14. The force exerted by torsional stress of the coil spring 23 is increased by the engagement of the turns of the spring on the outer cylindrical surface of the body 42 thus compressing and deforming it. In other embodiments, not shown, the coil spring may be "reversed" in the sense that it is torsionally stressed to expand the coils in use. In this embodiment the cylindrical elastomeric body would then surround the spring and be positioned between it and the tube 21, which of course would have to be suitably dimensioned to accommodate it.

Figure 2:
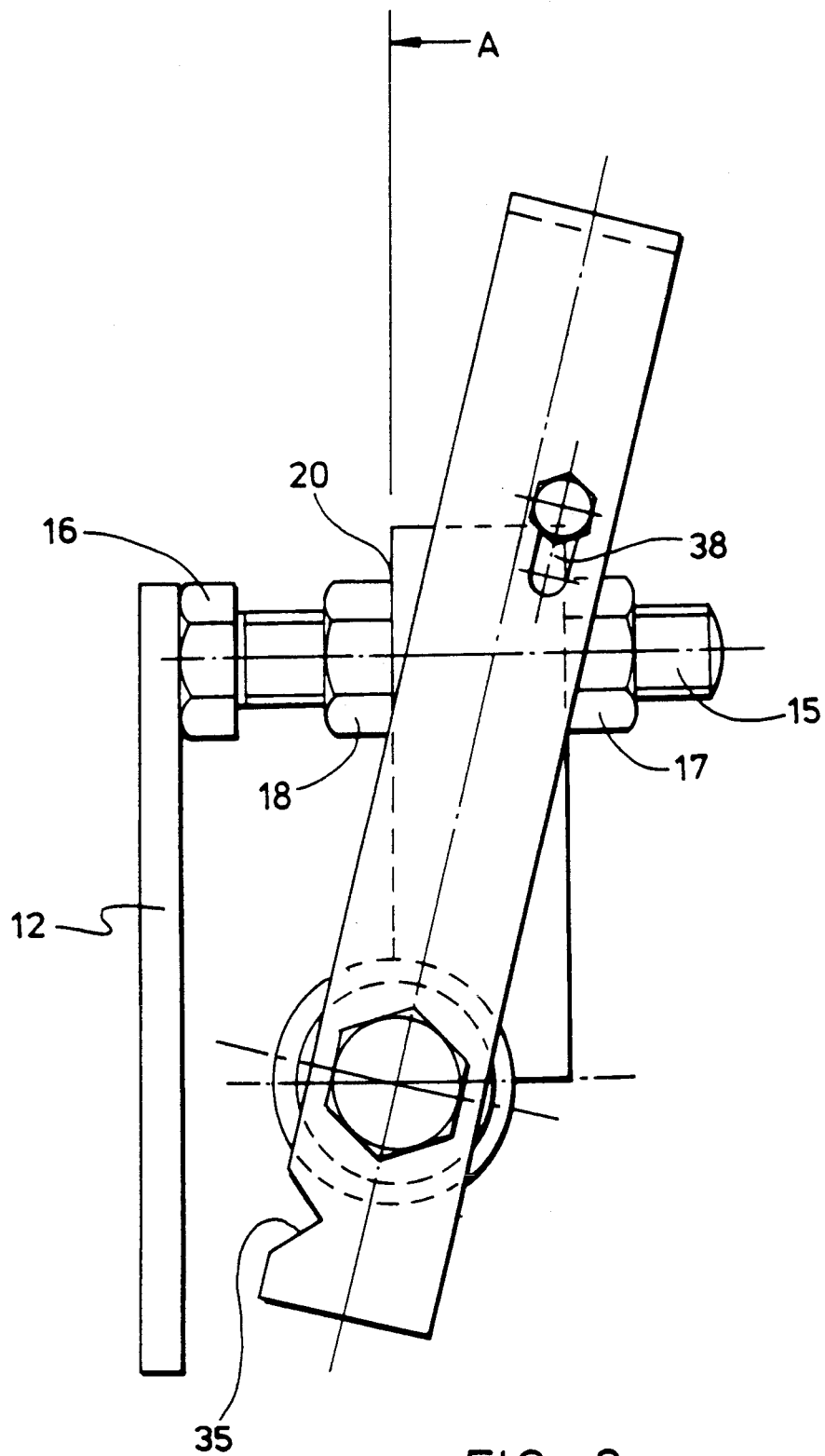
FIG. 2 is a side view of the clamping device illustrated in FIG. 1 shown in an operating position.

When it is desired to replace a skirt rubber 13 this can be achieved easily by pushing the bight portion 34 of the clamp arm 33 in the direction of the arrow A of FIG. 2 until the latch pin 39 drops ove the shoulder 29 as shown in FIG. 1. The latch pin 39 then prevents the clamp arm 33 from turning whilst the clamp member 36 and the skirt rubber 13 are changed or repositioned. When the desired position has been achieved it is simply necessary to take the tension off the latch pin 39 by pressing on the bight portion 34, raise the latch pin 39 by hand, operating either by gripping the head 40 and domed nut 41 between thumb and finger, or by introducing a suitable tool into the space between the limbs 31, 32 and the support body 14. When the latch pin has been raised past the shoulder 20 the coil spring 23 turns the clamp arm 33 in a clockwise direction as viewed in FIGS. 1 and 2 until the clamp member 36 is engaged against the skirt rubber 13. It will be appreciated that the lever arm from the privot axis X—X defined by the coil spring 23 and the clamp member 36 is very much shorter than the lever arm from this pivot axis to the bight portion 34 of the clamp arm 33 so that it is within the capabilities of the human operator to rotate the clamp device whilst the force exerted at the clamp member are very much higher than those required to release the clamp force.

Adjustment of the force applied by the clamp can be achieved by suitably adjusting the nuts 17, 18 along the bolt 15.

Although in the specific embodiment described the elastomeric body is a sliding fit on the pin, it would be equally possible, with appropriate changes to the stiffness or elasticity of the material, to employ a cylindrical body having a larger space between itself and the pin, although suitable locating collars at the ends of the body would then be required.

What is claimed is:

1. In a clamping device for holding a panel such as a conveyor belt skirt rubber in position, said clamping device comprising:
   a support body,
   means for attaching said support body to a fixed support such as a conveyor feed boot or skirt board,
   a clamp arm,
   means pivotally connecting said clamp arm to said support body, and
   resilient biasing means for urging said clamp arm to turn about said pivotal connection means
   the improvement wherein said resilient biasing means comprises a helical coil stressed in torsion to apply the required resilient biasing to hold said clamp arm in a required position, and
   a body of resilient material having a substantially cylindrical surface against which the turns of said helical coil engage when they change diameter as torsional forces are exerted thereon.

2. The clamping device of claim 1, wherein said body of resilient material is generally tubular and located radially inside the turns of said helical coil and substantially in contact therewith.

3. The clamping device of claim 2, wherein a central shaft or stem passing through said body of resilient material locates it in position.

4. The clamping device of claim 1, wherein there are provided means for receiving a clamp member at the operating end of said clamp arm.

5. The clamping device of claim 2, wherein there are provided means for releasing the clamp arm against the resilient bias the said torsion spring.

6. The clamping device of claim 5, wherein said clamp arm release means includes a latching pin.

7. The clamping device of claim 1, wherein said support body is fixed by a transverse bolt at or adjacent its upper end and said pivotal connection means between said support body and said clamp arm is located at a lower end of said support body.

8. The clamping device of claim 1, wherein said support body carries a tubular transverse spring housing having a slot for receiving a radially outwardly projecting end portion of said helical coil.

9. The clamping device of claim 1, wherein said clamp arm has at least one prismatic hole for receiving a correspondingly shaped prismatic pin having a radial hole for receiving a radially inwardly projecting end of said helical coil.

10. The clamping device of claim 1, wherein said helical coil is a metal coil spring.

11. The clamping device of claim 1, wherein said helical coil is replaced by a torsion member comprising one of a bar and a tube.

12. A clamping device for holding a panel such as a conveyor belt skirt rubber in position, said clamping device comprising:
    a support body,
    means for attaching said support body to a fixed support such as a conveyor feed boot or skirt board,
    a clamp arm comprising an inverted U-shape member having parallel limbs with respective slots,
    means pivotally connecting said clamp arm to said support body,
    resilient biasing means for urging said clamp arm to turn about said pivotal connection means, said resilient biasing means comprising a helical coil stressed torsion to apply the required resilient biasing to hold said clamp arm in a required position,
    a generally tubular body of resilient material located radially inside the turns of said helical coil and having a substantially cylindrical surface against which the turns of said helical coil engage when they change diameter as torsional forces are exerted thereon, and
    latching means for holding the clamp arm in a release position against the resilient bias of said helical coil, said support body having one of a shoulder and a notch engageable by said latching means whereby to hold said clamp arm in said release position.

* * * * *